United States Patent [19]

Sublett et al.

[11] 4,451,641
[45] May 29, 1984

[54] RADIATION-RESISTANT CONTAINER MATERIAL OF POLY(TETRAMETHYLENE TEREPHTHALATE)

[75] Inventors: Bobby J. Sublett, Kingsport; Samuel D. Hilbert, Jonesboro, both of Tenn.

[73] Assignee: Eastman Kodak Company, Rochester, N.Y.

[21] Appl. No.: 503,462

[22] Filed: Jun. 13, 1983

[51] Int. Cl.³ .............................................. C08G 63/48
[52] U.S. Cl. .................................. 528/295.5; 528/272; 528/302
[58] Field of Search ...................... 528/272, 295.5, 302

[56] References Cited

U.S. PATENT DOCUMENTS

| | | | |
|---|---|---|---|
| Re. 31,270 | 6/1983 | Tung | 528/301 X |
| 3,931,114 | 1/1976 | Gall et al. | 528/308.6 |
| 4,208,467 | 6/1980 | Coney | 528/305 X |
| 4,234,708 | 11/1980 | Edelman et al. | 528/305 X |
| 4,254,001 | 3/1981 | Tung | 528/301 X |
| 4,340,721 | 7/1982 | Bonnebat et al. | 528/302 X |
| 4,401,805 | 8/1983 | Weemes et al. | 528/302 |
| 4,403,090 | 6/1983 | Smith | 528/302 X |

Primary Examiner—Lucille M. Phynes
Attorney, Agent, or Firm—John F. Stevens; Daniel B. Reece, III

[57] ABSTRACT

Radiation-resistant containers or packaging sheet material of poly(tetramethylene terephthalate) modified with either dimer acid or dimer glycol. This copolyester is blow moldable and is found to have improved resistance to gamma radiation.

4 Claims, No Drawings

RADIATION-RESISTANT CONTAINER MATERIAL OF POLY(TETRAMETHYLENE TEREPHTHALATE)

DESCRIPTION

TECHNICAL FIELD

This invention relates to containers and packaging sheet materials of modified poly(tetramethylene terephthalate), which is resistant to radiation such as is encountered in medical sterilization methods.

BACKGROUND OF THE INVENTION

Various plastic devices used in medical applications require sterilization. Such devices include flexible tubing and small intravenous fluid bags for packaging drugs. Several methods of sterilization are currently available. These include steam, ethylene oxide and gamma radiation. Gamma radiation may be defined as electromagnetic radiation similar to x-rays except that gamma rays originate in the nucleus of an atom whereas x-rays originate in the extra nuclear structure. Gamma rays usually have higher energies and shorter wavelengths than x-rays. Radiation normally causes polyesters to break down in chain length (loss of inherent viscosity) with corresponding loss of physical properties, discoloration, etc. Most of the medical tubing used today is sterilized by ethylene oxide but this method has a drawback in that there is a need to insure no residual ethylene oxide in the plastic material.

U.S. Pat. No. 3,091,600 discloses linear aromatic acid copolyesters modified with dimer glycols having 36 carbon atoms. This patent claims polyesters having melting points of at least 200° C. The compositions disclosed in the present invention all melt at less than 200° C.

U.S. Pat. Nos. 3,915,913 and 3,931,073 relate to polyesters of dimer acid modified with poly(tetramethylene terephthalate) which can be blended with a vinyl aromatic polymer such as polystyrene or an aliphatic hydrocarbon. U.S. Pat. No. 4,216,129 involves molding compositions comprising a blend of poly(tetramethylene terephthalate) and poly(tetramethylene terephthalate) modified with dimer acid. The compositions disclosed in the present invention are copolyesters and do not involve blends of admixtures in any way.

DISCLOSURE OF INVENTION

According to the present invention, containers and packaging sheet materials are provided which are produced from copolyesters which possess a balance of properties which render them useful as gamma radiation resistant, flexible copolyesters for medical materials. Among the properties obtainable which render the compositions useful are the following:

Crystallization half time of less than 1 minute.
Melting point less than 200° C.
Modulus 162-352 kg/cm$^2$ for tubing
   703 kg/cm$^2$ for small I.V. bags
   352-1406 kg/cm$^2$ (preferably 703 kg/cm$^2$) for blow molding
Elongation greater than 200%.
Resistance to gamma radiation.
Tensile strength greater than 70.3 kg/cm$^2$.

The fast crystallization half times are important in being able to process the copolyesters for medical applications. The mechanical properties are in the range that would render the polymers useful for medical applications and the mechanical properties do not deteriorate appreciably during gamma radiation. It is believed the overall balance of properties renders the copolyesters useful for the present invention.

The copolyester according to this invention preferably has an inherent viscosity (I.V.) of at least 0.7, a melting point of less than 200° C., and is derived from 100 mole % of a dicarboxylic acid component and 100 mole % of a glycol component. The acids and glycols consist essentially of repeat units of terephthalic acid, 1,4-butanediol and about 15-50 mole % (based on the total acid and glycol content of 200 mole % of either dimer acid or dimer glycol. Thus, examples of the copolyesters used in the articles of this invention include the following: (a) about 50-85 mole % terephthalic acid, about 50-15 mole % dimer acid and about 100 mole % 1,4-butanediol, (b) about 100 mole % terephthalic acid, about 50-85 mole % 1,4-butanediol and about 50-15 mole % dimer glycol, and (c) about 80 mole % terephthalic acid, about 20 mole % dimer acid, about 80 mole % 1,4-butanediol and about 20 mole % dimer glycol.

Small amounts (up to about 5% of the glycol or acid component) of other aliphatic or alicyclic, straight or branched chain glycols or acids containing 2 to 40 carbon atoms may also be included.

It should be understood that polyester forming derivatives of the acids may be used rather than the acids themselves. For example, dimethyl terephthalate and dimethyl glutarate may be used rather than the corresponding acids.

The term "dimer acid" as used herein refers to a 36 carbon atom, long chain aliphatic dicarboxylic acid. The preparation and structure of the dimer acids is described in Journal of American Oil Chemists Society, 39, 534-545 (1962). It is generally prepared by dimerizing an unsaturated fatty acid containing 18 carbon atoms such as linoleic or linolenic acid or a monohydric alcohol ester thereof. It is recognized in the art that dimer acids are chemicals of unique properties. Several different grades of dimer acids are available commercially which vary in monomer and trimer content and iodine value. For example, dimer acid is available from Emery Industries, Inc. Preferably, the dimer acid used in this invention is substantially free of monomer and trimer fractions, which can be accomplished by distillation. Preferably, the dimer acid content is at least 95%. The dimer acid may be used in its hydrogenated or unhydrogenated form.

The dimer glycol is prepared by dimerizing unsaturated fatty acids such as linoleic and linolenic acids, and reducing the resulting acid or its ester to the corresponding glycol. The preparation and structure of the dimerized fatty acid and the glycol derived from it is described in J. Am. Chem. Soc., 66, 84 (1944), and in U.S. Patent to Johnston, No. 2,347,562. Several different grades of dimerized fatty acids are available from commercial sources and these acids vary in iodine value and in monomer and trimer content. The best results in obtaining copolyesters in accordance with this invention are usually obtained by employing a dimer acid fraction that has been substantially freed of monomer and trimer fractions by molecular distillation. The dimer glycol which is preferred for use in the invention is one containing approximately 36 carbon atoms and is obtained by reduction of an ester of the dimer acid fraction with copper chromite catalyst, such reduction resulting in conversion of ester to glycol and saturation of all double bonds which may have been present in the dimer ester.

The copolyesters may be prepared by conventional procedures well known in the art. An example of a suitable procedure is as follows:

A 500 ml, single-neck, round-bottom flask equipped with a ground glass head, a stirrer shaft, nitrogen inlet, and a side arm is charged with 46.56 g (0.24 mol) dimethyl terephthalate, 90.4 g (0–16 mol) dimer acid and 54 g (0.6 mol) 1,4-butanediol and 0.51 ml of a catalyst solution of acetyl triisopropyl titanate (0.0153 g, 101 ppm Ti). The flask is then immersed in a metal bath and heated with nitrogen sweeping the reaction mixture for one hour at 200° C. and 80 minutes at 210° C. The temperature of the metal bath is increased to 260° C., the nitrogen sweep is cut off and the pressure in the flask is reduced to 0.2–0.7 mm of mercury for one hour. The metal bath is then lowered away from the flask, the vacuum outlet clamped off, and the nitrogen inlet clamp opened to allow the flask to come to atmospheric pressure under a nitrogen blanket. The copolymer is allowed to cool and crystallize and is removed from the flask. The copolymer has an inherent viscosity of 0.88. This same general procedure may be used when dimer glycol is used rather than dimer acid.

The copolyesters are processable over a range of temperatures and molecular weights. The copolyesters have thermal and mechanical properties which render them useful as gamma radiation resistant, flexible copolyesters for medical applications.

The properties can be varied somewhat to render the polyesters useful in various applications. For example, the modulus can be varied depending on the level of modifier in the poly(tetramethylene terephthalate). The materials are useful in medical applications such as flexible tubing and small intravenous fluid bags for packaging drugs. The compositions have the advantage of allowing sterilization of the medical materials to be done using gamma radiation. The materials are also useful as blow moldable polyesters for medical applications such as containers for blood or intravenous solutions. The polyesters provide a simple, economical method of forming containers for medical applications.

Copolyesters are prepared by the general method described above. The mole percents of the acids are varied as shown, and physical properties are determined. The results are shown in the following tables.

TABLE 1

Properties on Extruded Film and Molded Bars of Poly(tetramethylene terephthalate) Modified With Dimer Acid Properties on Molded Bars

| Ex. No. | Mole % of Dimer Acid Modifier in Poly(tetramethylene terephthalate) | Inherent Viscosity Before Molding | Inherent Viscosity After Molding | Melting Point (°C.) | Cryst. Half Time Minimum Time (min.) | Cryst. Half Time Temp. (°C.) | Flexural Stiffness ASTM D747 kg/cm² (10⁵ PSI) | Tensile Strength ASTM D638 kg/cm² (10³ PSI) | % Break Elongation ASTM D638 |
|---|---|---|---|---|---|---|---|---|---|
| 1 | 25 | 0.965 | 0.956 | 173.6 | — | — | 984 (0.14) | 210 (3.00) | 172 |
| 2 | 30 | 0.950 | 0.907 | 161.9 | 0.1 | 70 | 618 (0.088) | 180 (2.57) | 178 |
| 3 | 35 | 0.870 | 0.869 | 151.0 | 0.2 | 60 | 421 (0.06) | 158 (2.25) | 309 |
| 4 | 40 | 0.880 | 0.880 | 135.1 | 0.1 | 50 | 190 (0.027) | 118 (1.68) | 227 |
| 5 | 45 | 0.780 | 0.770 | 124.6 | 0.2 | 40 | 239 (0.034) | 79 (1.12) | 393 |

Properties on Extruded Film

| Ex. No. | Mole % of Dimer Acid Modifier in Poly(tetramethylene terephthalate) | Inherent Viscosity Before Molding | Inherent Viscosity After Molding | Tensile Strength ASTM D882 kg/cm² (10³ PSI) Machine Direction | Tensile Strength ASTM D882 kg/cm² (10³ PSI) Transverse Direction | % Break Elongation ASTM D882 Machine Direction | % Break Elongation ASTM D882 Transverse Direction | Tangent Modulus ASTM D882 kg/cm² (10⁵ PSI) Machine Direction | Tangent Modulus ASTM D882 kg/cm² (10⁵ PSI) Transverse Direction |
|---|---|---|---|---|---|---|---|---|---|
| 6 | 30 | 0.93 | 0.92 | 285 (4.05) | 222 (3.16) | 897 | 882 | 492 (0.07) | 421 (0.06) |
| 7 | 35 | 0.87 | 0.88 | 117 (1.67) | 141 (2.01) | 620 | 673 | 281 (0.04) | 421 (0.06) |
| 8 | 40 | 0.87 | 0.87 | 105 (1.50) | 104 (1.48) | 722 | 647 | 211 (0.03) | 352 (0.05) |
| 9 | 45 | 0.77 | 0.76 | 77 (1.09) | 72 (1.03) | 830 | 788 | 141 (0.02) | 141 (0.02) |

TABLE 2

| Ex. No. | Inherent Viscosity After Extrusion | After Exposure with 1.5 mrads* | After Exposure with 4 mrads* |
|---|---|---|---|
| 10 | 0.907 | 0.882 | 0.856 |
| 11 | 0.854 | 0.819 | 0.799 |
| 12 | 0.849 | 0.820 | 0.798 |

| Ex. No. | After Extrusion Machine Direction | After Extrusion Transverse Direction | After Exposure with 1.5 mrads* Machine Direction | After Exposure with 1.5 mrads* Transverse Direction | After Exposure with 4 mrads* Machine Direction | After Exposure with 4 mrads* Transverse Direction |
|---|---|---|---|---|---|---|
| | Yield Stress** kg/cm² (10³ PSI) | | | | | |
| 10 | 74 (1.05) | 63 (0.89) | 77 (1.10) | 77 (1.11) | 81 (1.15) | 77 (1.10) |
| 11 | 53 (0.75) | 63 (0.90) | 60 (0.86) | 67 (0.95) | 60 (0.85) | 69 (0.98) |
| 12 | 45 (0.64) | 51 (0.73) | 52 (0.74) | 50 (0.71) | 51 (0.73) | 52 (0.75) |
| | % Break Elongation** (D882) | | | | | |
| 10 | 897 | 882 | 797 | 875 | 922 | 877 |
| 11 | 620 | 673 | 935 | 920 | 935 | 935 |
| 12 | 722 | 647 | 912 | 935 | 893 | 883 |
| | Tensile Strength** (kg/cm²) (10³ PSI) | | | | | |

TABLE 2-continued

| 10 | 285    | 222    | 269    | 252    | 289    | 245    |
|----|--------|--------|--------|--------|--------|--------|
|    | (4.05) | (3.16) | (3.82) | (3.59) | (4.11) | (3.49) |
| 11 | 117    | 141    | 178    | 169    | 153    | 179    |
|    | (1.67) | (2.01) | (2.53) | (2.41) | (2.18) | (2.55) |
| 12 | 105    | 104    | 153    | 106    | 142    | 104    |
|    | (1.50) | (1.48) | (2.17) | (1.51) | (2.02) | (1.48) |

*microrads
**ASTM D882

TABLE 3

Properties on Molded Bars of Copolyesters Synthesized Using Dimer Acid and Dimer Glycol

| Composition | T.V. Before Molding | T.V. After Molding | m.p. (°C.) | Cryst. Half Time Minimum Time (min.) | Cryst. Half Time Minimum Temp. °C. | Flex. Stiffness* kg/cm² ($10^5$ PSI) | Tensile Strength** kg/cm² ($10^3$ PSI) | % Break Elongation** |
|---|---|---|---|---|---|---|---|---|
| 60 mole % terephthalic acid<br>40 mole % dimer acid<br>100 mole % 1,4-butanediol | 0.88 | 0.88 | 135.1 | 0.1 | 50 | 190 (0.027) | 118 (1.68) | 227 |
| 100 mole % terephthalic acid<br>60 mole % 1,4-butanediol<br>40 mole % dimer acid | 0.515 | 0.518 | 148.2 | 0.1 | 50 | 387 (0.055) | 127 (1.80) | 259 |

*ASTM D747
**ASTM D638

Crystallization half times and melting points of the copolymers in the examples according to this invention are less than 1 minute and less than 200° C. respectively. Discoloration due to radiation exposure is minimal.

The crystalline melting point, $\Delta H_f$, and $T_g$ referred to above are measured by conventional means using a Differential Scanning Calorimeter.

Ester forming derivatives of the acids referred to herein can be employed, if desired, to prepare the copolyesters of this invention. Examples of such ester forming derivatives are the anhydrides, esters and ester chlorides of such acids.

One of the commonly used parameters for describing the crystallization rate of a polymer is the crystallization half-time, $t_{\frac{1}{2}}$. The crystallization half-time is simply the time at which the crystallization of the originally amorphous sample is half completed according to the method used to monitor crystallinity and may be determined in conventional manners. The half-time is strongly dependent on the crystallization temperature. Reference is made to "Kinetics of Phase Change.II—Transformatin—Time Relations for Random Distribution of Nuclei" by Melvin Avrami, published in "Journal of Chemical Physics", Feb., 1940, page 212.

One way of determining the isothermal crystallization of a polymer is an approximateion described by the Avrami equation $$X = X_o(1 - e^{-(t/\tau)^n}) \quad (1)$$

where $X_o$ is the limiting value of the crystallinity, X is isothermal crystallization, $\tau$ is a characteristic time determined by the polymer and the crystallization temperature, and n is the so-called Avrami exponent, generally in the range 2.0 to 3.5. The reduced crystallization half-time, $(t/\tau)_{\frac{1}{2}}$, is obtained by solving $$\frac{X}{X_o} = \frac{1}{2} = 1 - e^{-(\frac{t}{\tau})^n_{\frac{1}{2}}} \text{ to get} \quad (2)$$

$$\left(\frac{t}{\tau}\right)_{\frac{1}{2}} = \sqrt[n]{\ln 2} \quad (3)$$

The DSC response obtained would be described by differentiating equation (1) with respect to time to get $$\frac{dX}{dt} = X_o \frac{n}{\tau} \left(\frac{t}{\tau}\right)^{n-1} e^{-(\frac{t}{\tau})^n} \quad (4)$$

This function has a maximum for all $n > 1$. Differentiating equation 4 with respect to time, setting the derivative equal to zero and solving to $t/\tau$, one finds the maximum of dX/dt, which is the peak of the DSC curve, to be located at $$\frac{t_p}{(\tau)} = \sqrt[n]{\frac{n-1}{n}} \quad (5)$$

where $t_p$ is the time required to reach the peak of crystallization exotherm. The ratio of $t_p/(\tau)$ to $(t/\tau)_{\frac{1}{2}}$, $$\frac{(t_p)}{\tau} \bigg/ \left(\frac{t}{\tau}\right)_{\frac{1}{2}} = \frac{t_p}{t_{\frac{1}{2}}} = \sqrt[n]{\frac{n-1}{n \ln 2}} \quad (6)$$

The ratio $t_p/t_{\frac{1}{2}}$ is between 0.85 and 1.04 for $n > 2$. The curve of $t_p$ vs. crystallization temperature is a sufficient approximation of the curve $t_{\frac{1}{2}}$ vs. crystallization temperature.

Another use for copolyesters according to this invention is for the production of blow moldable polyesters for biomedical applications. Biomedical containers such as those used for blood and intravenous solutions are currently made of glass or poly(vinyl chloride) (PVC). Glass is being replaced because of its weight, bulkiness, and susceptibility to breakage. Replacements for PVC are being sought because of the lack of consumer confidence in this material. PVC containers are made from extruded film by a rather involved process. Pellets are extruded into films. The film is cut to the required sizes and two pieces are sealed on the sides and at the ends to form a bag. The bag is also fitted with one or more tubing connections. A simpler method of forming containers or bags for biomedical applications would be highly desirable. Extrusion blow molding of film or bottles should offer a significant reduction in the number of steps, thus, the cost of producing biomedical containers. Extrusion blown film would require sealing two edges instead of four. The use of extrusion blown bottles for containers would be even simpler than using extrusion blown film since a bottle having the desired shape and openings could be blown in one step. PVC used in many biomedical applications such as containers for blood and intravenous solutions cannot be blow molded because of its high plasticizer content. Some property requirements for a blow moldable polyester for biomedical applications are as follows:

1. Melt strength sufficient for production of blown film or bottles.
2. Clarity equal to PVC or better.
3. Modulus 5,000–20,000 psi preferably about 10,000 psi.

If desired, dyes or dye receptive agents, color stabilizers and various other adjuvants may be added to the copolyester adhesives to meet certain specific end use requirements. Such additives would normally be added as such to the polymerization mixture in which the copolyester is produced.

As used herein, the inherent viscosity (I.V.) is measured at 25° C. using 0.50 gram of copolyester per 100 ml. of a solvent consisting of 60 percent by weight phenol and 40 percent by weight tetrachloroethane.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A container characterized by improved resistance to gamma radiation comprising a copolyester derived from 100 mole % of a dicarboxylic acid component and 100 mole % of a glycol component, said copolyester consisting essentially of repeat units from terephthalic acid and 1,4-butanediol and about 15–50 mole % based on the total of 200 mole % of at least one compound selected from the group consisting of dimer acid and dimer glycol.

2. A container according to claim 1 in which said copolyester comprises about 15–50 mole % dimer acid.

3. A container according to claim 1 in which said copolyester comprises about 15–50 mole % dimer glycol.

4. Flexible sheet material characterized by improved resistance to gamma radiation comprising a copolyester derived from 100 mole % of a dicarboxylic acid component and 100 mole % of a glycol component, said copolyester consisting essentially of repeat units from terephthalic acid and 1,4-butanediol and about 15–50 mole % based on the total of 200 mole % of at least one compound selected from the group consisting of dimer acid and dimer glycol.

* * * * *